United States Patent
Goodwin, II et al.

(10) Patent No.: US 11,267,986 B2
(45) Date of Patent: Mar. 8, 2022

(54) SYSTEM FOR COATINGS FOR GRANULAR MATERIALS

(71) Applicant: Nous, LLC, Florence, AL (US)

(72) Inventors: Robert Michael Goodwin, II, Florence, AL (US); Joshua Tyler Green, Waterloo, AL (US); James Trevor Reed, Muscle Shoals, AL (US); Christopher Eric Jones, Saint Joseph, TN (US); Phillip Alan Forsythe, Florence, AL (US)

(73) Assignee: NOUS, LLC, Florence, AL (US)

( * ) Notice: Subject to any disclaimer, the term of this patent is extended or adjusted under 35 U.S.C. 154(b) by 0 days.

(21) Appl. No.: 16/786,987

(22) Filed: Feb. 10, 2020

(65) Prior Publication Data
US 2020/0190356 A1    Jun. 18, 2020

Related U.S. Application Data

(63) Continuation of application No. 15/725,684, filed on Oct. 5, 2017, now Pat. No. 10,563,089.
(Continued)

(51) Int. Cl.
*C09D 175/08*    (2006.01)
*C09D 175/06*    (2006.01)
(Continued)

(52) U.S. Cl.
CPC ............ *C09D 175/08* (2013.01); *B05D 7/50* (2013.01); *C05B 7/00* (2013.01); *C05C 1/00* (2013.01);
(Continued)

(58) Field of Classification Search
None
See application file for complete search history.

(56) References Cited

U.S. PATENT DOCUMENTS

| | | |
|---|---|---|
| 3,183,112 A | 5/1965 | Gemassmer |
| 4,711,659 A | 12/1987 | Moore |

(Continued)

FOREIGN PATENT DOCUMENTS

| | | |
|---|---|---|
| CA | 2149075 | 11/1996 |
| CN | 103304772 A | 9/2013 |

(Continued)

OTHER PUBLICATIONS

International Search Report and Written Opinion, dated Jan. 16, 2018, pp. 1-13, International Patent Application No. PCT/US2017/055301, European Patent Office, Rijswijk, The Netherlands.
(Continued)

*Primary Examiner* — Wayne A Langel
(74) *Attorney, Agent, or Firm* — Crowell & Moring LLP

(57) ABSTRACT

A coating is applied in one or more layers on a granular material, such as a granular fertilizer material or the like. The coating may include a diisocyanate in either pure form or partially polymerized form, a polyol or polyol mix, and optionally a wax. The polyol or polyol mix may be, for example, a polyester polyol, a polyether polyol, or combinations thereof. In some examples, the polyol or polyol mix may be an aliphatic glycerine initiated polyether polyol, an aliphatic amine initiated trifunctional polyol, castor oil or castor oil derivative, or ethylene diamine that has been propoxylated or ethoxylated, and combinations thereof. The coating is reacted on the granular material.

14 Claims, 13 Drawing Sheets

Related U.S. Application Data

(60) Provisional application No. 62/404,254, filed on Oct. 5, 2016.

(51) Int. Cl.

| | | |
|---|---|---|
| *C05C 9/00* | (2006.01) | |
| *C05C 1/00* | (2006.01) | |
| *C05C 5/00* | (2006.01) | |
| *C05G 5/30* | (2020.01) | |
| *B05D 7/00* | (2006.01) | |
| *C05C 5/04* | (2006.01) | |
| *C05B 7/00* | (2006.01) | |
| *C05D 1/00* | (2006.01) | |
| *C05C 7/02* | (2006.01) | |

(52) U.S. Cl.
CPC ............ *C05C 5/005* (2013.01); *C05C 5/04* (2013.01); *C05C 7/02* (2013.01); *C05C 9/005* (2013.01); *C05D 1/005* (2013.01); *C05G 5/37* (2020.02); *C05G 5/38* (2020.02); *C09D 175/06* (2013.01)

(56) References Cited

U.S. PATENT DOCUMENTS

| | | | |
|---|---|---|---|
| 4,752,399 A | 6/1988 | Viator et al. | |
| 4,804,403 A | 2/1989 | Moore | |
| 4,969,947 A | 11/1990 | Moore | |
| 5,219,465 A | 6/1993 | Goertz et al. | |
| 5,374,292 A | 12/1994 | Detrick et al. | |
| 5,538,531 A | 7/1996 | Hudson et al. | |
| 5,599,374 A | 2/1997 | Detrick | |
| 5,851,261 A | 12/1998 | Markusch et al. | |
| 6,001,147 A | 12/1999 | Markusch et al. | |
| 6,152,981 A | 11/2000 | Markusch et al. | |
| 6,338,746 B1 | 1/2002 | Detrick et al. | |
| 6,358,296 B1 | 3/2002 | Markusch et al. | |
| 6,663,686 B1 | 12/2003 | Geiger et al. | |
| 7,267,707 B2 | 9/2007 | Rosenthal et al. | |
| 9,067,842 B2 | 6/2015 | Neff et al. | |
| 9,102,573 B2 | 8/2015 | Hudson et al. | |
| 9,163,110 B2 | 10/2015 | Watanabe et al. | |
| 10,202,314 B2 | 2/2019 | Xing et al. | |
| 2003/0033843 A1 | 2/2003 | Tabei | |
| 2003/0051523 A1 | 3/2003 | Tabei | |
| 2006/0115586 A1 | 6/2006 | Xing et al. | |
| 2010/0326152 A1 | 12/2010 | Mente | |
| 2013/0305796 A1 | 11/2013 | Hudson et al. | |
| 2014/0331727 A1 | 11/2014 | Hargrove et al. | |
| 2015/0040630 A1 | 2/2015 | Yang et al. | |
| 2015/0132484 A1 | 5/2015 | Forsythe | |
| 2015/0376077 A1 | 12/2015 | Barr et al. | |
| 2016/0297725 A1 | 10/2016 | No et al. | |
| 2017/0036968 A1* | 2/2017 | Praw | C05G 3/40 |
| 2018/0022661 A1 | 1/2018 | Achille et al. | |

FOREIGN PATENT DOCUMENTS

| | | |
|---|---|---|
| EP | 0867422 A2 | 9/1998 |
| EP | 1 106 635 A2 | 6/2001 |
| EP | 1 172 347 A2 | 1/2002 |
| TW | 442448 B | 6/2001 |
| WO | WO 98/29360 | 7/1998 |
| WO | WO 2007/016788 A1 | 2/2007 |

OTHER PUBLICATIONS

Prior Art Submission Under Section 34.1(1) of the Patent Act of Canada, dated May 7, 2021, pp. 1-12, filed in Canadian Patent Application No. 3,038,828, Canadian Intellectual Property Office, Gatineau, Quebec, Canada.

Canadian Office Action dated Aug. 12, 2021, pp. 1-3, issued in Canadian Patent Application No. 3,038,828, Canadian Intellectual Property Office, Gatineau, Quebec, Canada.

Chinese Office Action with English translation for Chinese Patent application No. 201780061813.3, dated Jul. 1, 2021, pp. 1-18, China National Intellectual Property Administration, Beijing, People's Republic of China.

* cited by examiner

SYSTEM FOR COATINGS FOR GRANULAR MATERIALS

PRIORITY CLAIM

This application is a continuation of U.S. patent application Ser. No. 15/725,684 filed Oct. 5, 2017, which claims priority to U.S. provisional patent application Ser. No. 62/404,254, filed Oct. 5, 2016, both of which are entirely incorporated by reference.

TECHNICAL FIELD

The technical field relates generally to the coatings. More particularly, the technical field relates to coatings for granular materials, such as granular fertilizer materials or the like, granular materials with coatings, and methods for coating granular materials. In one example, a coating may be added to granules of fertilizer to control the release of a component(s) and/or improve the mechanical properties of the granules.

BACKGROUND

Polymer coatings may be applied to granular materials such as fertilizers or the like. The substituent parts of the polymer may be applied in a reaction vessel and allowed to mix and cure on the granules. Polymer coated fertilizers typically release (e.g., nutrients and/or the like) at a slower rate than uncoated fertilizer which provides many economic and environmental benefits. Polymer coatings may also be applied to other granular substances for reasons such as reducing degradation or preventing contamination.

BRIEF DESCRIPTION OF THE DRAWINGS

The drawings described herein are for illustration purposes only and are not intended to limit the scope of the present disclosure in any way.

It should be understood that throughout the drawings, corresponding reference numerals indicate like or corresponding parts and features.

DETAILED DESCRIPTION OF THE INVENTION

Figure 1:
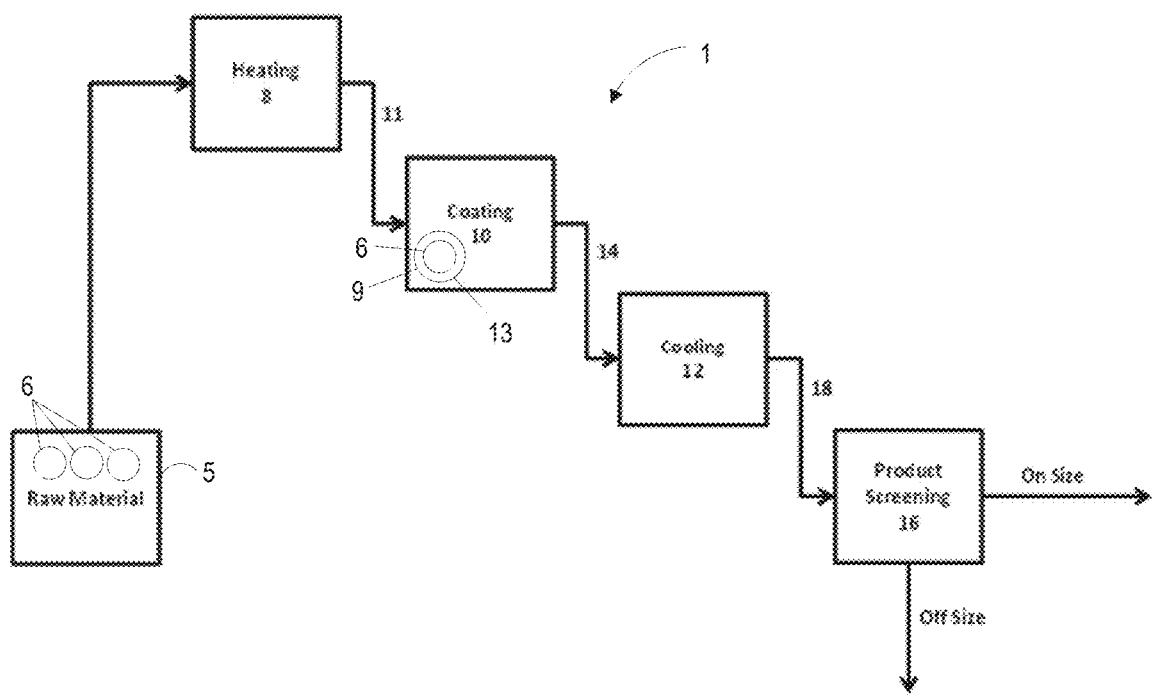
FIG. 1 is a schematic representation of a coating process for applying a coating to a fertilizer in accordance with an exemplary embodiment.

The following description is merely exemplary in nature and is not intended to limit the present disclosure or its application or uses.

Various embodiments contemplated herein include applying a coating to a granular material which may include but is not limited to any nitrogen, phosphorus, potassium (NPK) fertilizer. Non-limiting examples of such granular materials include mineral fertilizers or mineral salt fertilizers. Examples of such fertilizers may include fertilizers that include nitrate ions or ammonium ions. A non-limiting example list of granular materials may include urea, calcium nitrate, ammonium nitrate, potassium chloride, monoammonium phosphate, diammonium phosphate, and other fertilizers as well. In an exemplary embodiment, the coating includes a wax, a diisocyanate in either pure form or polymerized to some degree, and a polyol or a polyol mix.

The polyol may be a polyester or a polyether, or a mix thereof. In some examples, the polyol may be, for example, any combination of an aliphatic glycerine initiated polyether polyol with a molecular weight (weight average) from about 500 to about 1200 Daltons such as a reaction product of glycerine and propylene oxide such as Polyol D (shown in Tables 1 and 2 of Polyol Properties), an aliphatic amine initiated trifunctional polyol such as Polyol B (shown in Tables 1 and 2 of Polyol Properties), castor oil or castor oil derivative such as Polyol A (shown in Tables 1 and 2 of Polyol Properties) and ethylene diamine that has been propoxylated and/or ethoxylated to an average molecular weight (weight average) from about 227 to about 282 Daltons, such as Polyol C (shown in Tables 1 and 2 of Polyol Properties). For each of the molecular weights described in this paragraph, the word "about" means +/−50 Daltons. The wax may be present or omitted in some embodiments. The coating is reacted on the surface of the granular material. Thus, a coated granular material may be produced.

In some examples, the coating may include between about 1% and about 20%, inclusively, where "about" is +/−0.5%, by weight of the coated granular material. Alternatively or in addition, in some examples, the coated granular material may have an average diameter of between about 0.8 mm and about 4 mm, inclusively, where "about" is +/−0.5 mm. In some examples, the coating process of the granular material with the coating may be conducted at a temperature of between about 120° F. and about 180° F., inclusively, where "about" is +/−2° F.

The coating process may occur with the application of several layers of coating. In some examples, the layers may be the same polyol or polyol mix. Alternatively or in addition, different polyol or polyol mixes may be applied at different layers during the coating process. For example, one or more first layers of coating including a first polyol or polyol mix may be reacted onto the granular material followed by a second layer including a second polyol or polyol mix may be reacted onto the first layer. In some examples, as described in the examples herein, each coating layer may be applied to the granular material in a rotating drum. A residence time for the application of each layer, in some examples, may be between about 2 minutes and about 10 minutes, where "about" is +/−1 minute. The residence time for the application of each layer may vary, even to outside the stated range in some examples, depending on temperature, granular material, coating weight percentage, and number of layers.

In some examples, the coated granular material may be coated with only a single layer of coating. Alternatively, in some examples, the coated granular material may be coated with as many as 15 layers of coating, or more. In some examples, a final coating layer (outer coating) may be applied in 1.5 to 2 times the period of time in which the other coating layers are applied in order to allow the granular material to cure before being discharged to cooling.

Referring now to the drawings, FIG. 1 is a diagram of an example coating plant 1 that could apply a coating to a granular material 6 such as fertilizer.

Granules 6 from zone 5 are initially heated in zone 8 and passed along line 11 for introduction to a coating vessel 10. Once the granules 6 are in the coating vessel 10, the components of the coating 9 are applied in specific ratios. The components of the coating 9 may be applied, for example, in 1 to 15 layers. The coated granular materials 13 are passed along line 14 and cooled in zone 12, and passed along line 18 for product screening in zone 16 and are then stored.

In one embodiment (referred to hereinafter as embodiment 1), the polyol is applied in the coating vessel 10 and includes from about 1% to about 99% alkoxylated ethylene diamine (e.g, Polyol C) and from about 1% to about 99% Castor Oil (e.g., Polyol A) or from about 1% to about 99% polyether polyol (e.g., Polyol D), where "about" is +/−1% for each of the ranges described. An isocyanate is applied which may be, for example, a partially polymerized methylene diphenyl diisocyanate (pMDI). Unless stated otherwise, all percentages (%) provided herein are on a weight percentage basis. Illustrations of embodiment 1 are described herein in at least Example 3-Example 10.

In another embodiment (referred to hereinafter as embodiment 2), the polyol is applied in the coating vessel 10 and includes from about 5% to about 100% of an about 500 to about 1200 Daltons molecular weight (weight average) glycerine initiated polyether polyol such as Polyol D and from 0% to 95% ethoxylated and/or propoxylated ethylene diamine such as Polyol C. The isocyanate applied may be a partially polymerized methylene diphenyl diisocyanate. A wax is applied which may be, for example, a high alpha (HA) olefin. When considering weight percentages, the word "about" as used in this paragraph, refers to +/−1%. When considering molecular weights, the word "about" as used in this paragraph, refers to +/−50 Daltons. Illustrations of embodiment 2 are described herein in at least Example 1, Example 2, and Example 12.

In another embodiment (referred to hereinafter as embodiment 3), the polyol is applied in the coating vessel 10 and includes from about 5% to about 100% Castor oil or Castor oil derivative (e.g., Polyol A), or about 500 to about 1000 Daltons (e.g., 700 Daltons) molecular weight (weight average) glycerine initiated polyether polyol (e.g., Polyol D), and from about 0% to about 100% ethoxylated and/or propoxylated aliphatic amine (e.g., Polyol B). When considering weight percentages, the word "about" as used in this paragraph, refers to +/−1%. When considering molecular weights, the word "about" as used in this paragraph, refers to +/−50 Daltons. An illustration of embodiment 3 is described herein in at least Example 11.

In embodiments 1, 2, and 3, the granules 6 enter a continuous coating drum 10 and are coated with a polyol or polyol mix, an isocyanate or isocyanate mix, which may be a polymeric methylene diphenyl diisocyanate (pMDI), and a wax, with repeating layers of polyol and isocyanate or isocyanate mix and/or wax as desired. The wax may be, for example, a petroleum or petrolatum wax, a microcrystalline wax, a paraffin wax or olefin wax. In one embodiment, the wax is a high alpha olefin wax with from 16 to 40 carbons in average chain length and has more than about 90% by weight chains of 30 or more carbons. Each layer may not necessarily contain a wax, isocyanate or isocyanate mix, polyol or polyol mix component. Each layer may include a different portion of wax. For example, a total amount of wax used may be split between a first layer and a third layer. The first layer may include, for example, about 60% of the total wax used in all layers of the coating and the third layer may include, for example, about 40% of the total wax used in all layers of the coating, where "about" means +/−5%. Proportions of the total wax used in the coatings may be adjusted as desired. The coating chemicals 9 may also be mixed before application to the granules 6.

The following examples are provided for illustrative purposes only and are not meant to limit the various embodiments of coatings of granular materials, coated granular materials, and methods for coating granular materials in any way. In all of the examples described herein, a liquid precursor or precursor may be described. The precursor refers, generally, to ingredients that form the coating. The precursors may be the polyols, the wax, or the isocyanate used the coating, and the liquid precursors may be the precursors in liquid form.

EXAMPLE 1

A 3% total batch coating of granular urea (e.g., total coating in an amount of about 3 weight percent (wt. %) of the coated product (coated granular urea)), with a nominal size range of −5+10 (herein understood to mean minimal size of granules will pass through a 5 Tyler mesh sieve/screen (opening size of mesh sieve is about 0.157 inches (4.0 mm) but will be retained on a 10 Tyler mesh sieve/screen (opening size of mesh sieve is about 0.0661 inches (1.7 mm)), was performed in a rotating drum. The drum dimensions were 14"×4". The drum was equipped with a removable front dam and had a 6" hole for easy access to the granular urea for liquids addition. The liquid precursors used to create the coating were 14.41 g of pMDI (4,4-diphenylmethane diisocyanate), 21.66 g of Polyol D and 6.01 g C30+ alpha olefin wax. The pMDI:Polyol mass ratio used was about 0.665:1, where "about" includes mass ratios between 0.575:1 and 0.725:1. The total wax overcoat was 14.28%+/−0.2% of the total coating weight. The coating drum was filled with 3 lbs of granular urea and run at 8.3 RPM. The urea was maintained at a temperature of 160±2° F. for the entirety of the coating test. The coating was placed onto the granular urea in three substantially similar layers with the exception of wax. The wax was split 60:40 and placed on the first and third layers respectively. In other examples, the wax may be split into other proportions, or alternatively or in addition, the wax may be placed on layers other than the first or third layer. There were five minutes between the pMDI additions which allowed the precursor materials time to mix and fully react. In other examples, the time between the pMDI additions may be greater, for example 10 minutes, to allow the precursor materials time to mix and fully react. After all liquid precursors were placed onto the granular urea, the liquid precursors and granular urea were allowed to cure and roll in the drum for 8 minutes+/−1 minute. A cooling apparatus, such as a fan, may supply a cooling fluid, such as air, to cool the liquid precursors on the granular urea.

In Example 1, a fan was set up and blown on top of the rolling bed to cool the liquid precursors and granular urea, resulting in the coated granular material. The coated granular material reached a final temperature of 125° F.+/−5° F.

An example of a coating schedule table is shown below:

|  | Component | Wt (g) | Vol (ml) | Elapsed time (mm:ss) | End |
|---|---|---|---|---|---|
| Layer 1 | MDI | 4.80 | 3.94 | 00:00 | 00:00 |
|  | Polyol | 7.22 | 7.01 | 01:00 | 01:00 |
|  | Wax | 3.61 | 4.56 | 02:00 | 02:00 |
| Layer 2 | MDI | 4.80 | 3.94 | 05:00 | 05:00 |
|  | Polyol | 7.22 | 7.01 | 06:00 | 06:00 |
|  | Wax | 0.00 | 0.00 |  |  |
| Layer 3 | MDI | 4.80 | 3.94 | 10:00 | 10:00 |
|  | Polyol | 7.22 | 7.01 | 11:00 | 11:00 |
|  | Wax | 2.40 | 3.04 | 12:00 | 12:00 |
| Layer 4 | MDI | 0.00 | 0.00 |  |  |
|  | Polyol | 0.00 | 0.00 |  |  |
|  | Wax | 0.00 | 0.00 |  |  |
| Layer 5 | MDI | 0.00 | 0.00 |  |  |
|  | Polyol | 0.00 | 0.00 |  |  |
|  | Wax | 0.00 | 0.00 |  |  |
| Layer 6 | MDI | 0.00 | 0.00 |  |  |
|  | Polyol | 0.00 | 0.00 |  |  |
|  | Wax | 0.00 | 0.00 |  |  |
|  | Total Wt. | 42.07 g | | Heat off | 20:00 |
|  |  |  |  | Drum Stop | 27:00 |

Figure 2:
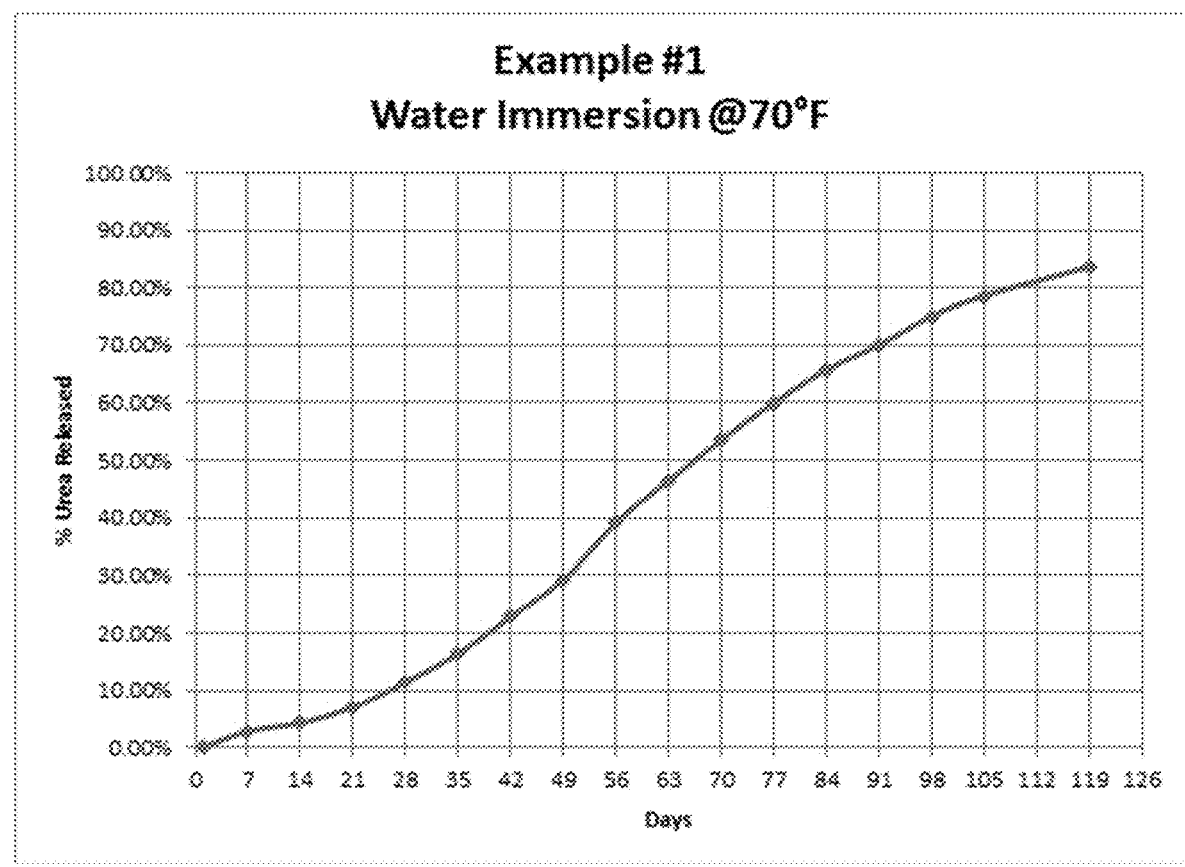
FIG. 2 is a graph plotting a dissolution of a first example of a coated granular fertilizer over several days.

FIG. 2 shows a graph plotting a dissolution curve of the coated granular fertilizer made in Example 1 as the coated granular fertilizer was immersed in water over several days.

EXAMPLE 2

A continuous coating of granular urea, with a nominal size range of −5+10, was performed in a rotating drum. The rotating drum dimensions were 2'×5' for the coating section, 2'×9" for the cooling section, and 2'×6.5" for the screener section, however larger or smaller drums may be used. The liquid precursors used to create the coating were pMDI (4,4-diphenylmethane diisocyanate), Polyol D and C30+ alpha olefin wax. The pMDI:Polyol mass ratio used was 0.665:1. The total wax overcoat was 14.28%+/−0.2% of the total coating weight. The coating apparatus was run at 6 RPM's with the urea feed rate set at 561 PPH. The coating apparatus had a 5" end dam ring installed for to facilitate achieving a retention weight of 180 lbs and a total retention time of 20 minutes. The urea was introduced into the coating apparatus at 160° F. Substrate temperature was maintained at 160±2° F. through the entirety of the coating apparatus. Three pairs of nozzles (8 total nozzles) were placed above the surface of the rolling bed of urea. The first and third pair of nozzles includes a pMDI, polyol, and wax nozzle. The second pair includes a pMDI and polyol nozzle. Each nozzle pair was spaced to achieve approximately 5 minutes of retention between each for curing. Each liquid was metered in specific quantities to achieve a total product coating of 3.25%+/−0.5%. The wax was split 60:40 on the first and third nozzle pairs, respectively. After the final nozzle pair there was 8.5 minutes+/−1 minute of retention for curing and cooling. After the coated granules were cooled, the cooled coated granules entered the rotary screener and were then bagged. This coating test was performed for 2 hours and 25 minutes.

Figure 3:
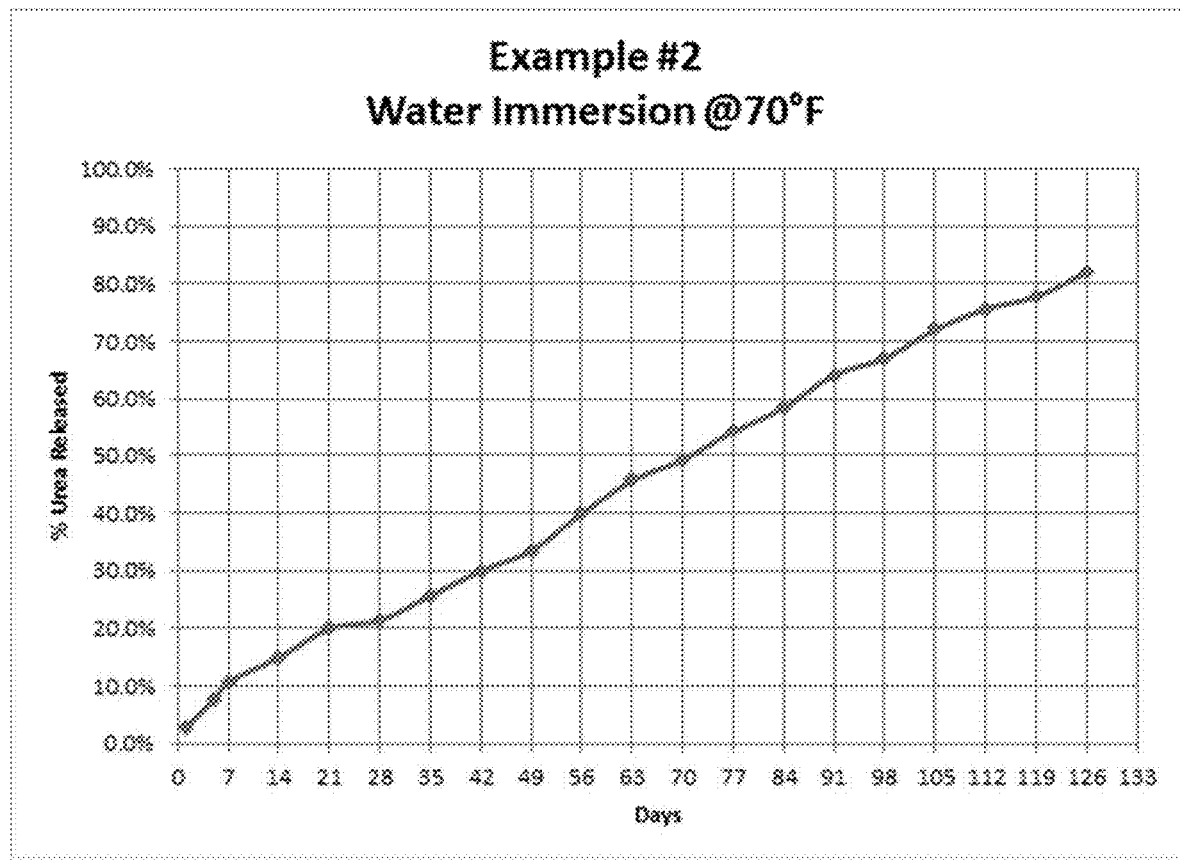
FIG. 3 is a graph plotting a dissolution of a second example of a coated granular fertilizer over several days.

FIG. 3 shows a graph plotting a dissolution curve of the coated granular fertilizer made in Example 2 as the coated granular fertilizer was immersed in water over several days.

EXAMPLE 3

A 3% total batch coating of granular urea (e.g., total coating in an amount of about 3 wt. % of the coated product (coated granular urea)), with a nominal size range of −5+10, was performed in a rotating drum. The drum dimensions were 14"×4". The drum was equipped with a removable front dam and had a 6" hole for easy access to the granular urea for liquids addition. The liquid precursors used to create the coating were 19.26 g+/−0.5 g of pMDI (4,4-diphenylmethane diisocyanate), 16.8 g+/−0.5 g of a 60/40 mixture of Polyol A and C, and 6.01 g C30+ alpha olefin wax. The pMDI:Polyol mass ratio used was about 1.15:1, where "about" include mass ratios from 1:1 to 1.3:1 pMDI:Polyol. The total wax overcoat was 14.28%+/−0.2% of the total coating weight. The coating drum was filled with 3 lbs of granular urea and run at 8.3 RPM. The urea was maintained at a temperature of 160±2° F. for the entirety of the coating test. The coating was placed onto the granular urea in three identical layers with the exception of wax. The wax was split 60:40 and placed on the first and third layers respectively. There were five minutes+/−1 minute between the polyol additions which allowed the precursors time to mix and fully react. After all liquid precursors were placed onto the granular urea, the liquid precursors and granular urea were allowed to cure and roll for 8 minutes+/−1 minute. A fan was then set up and blown on top of the rolling bed to cool the liquid precursors and granular urea, resulting in the coated granular material. The coated granular material reached a final temperature of 125° F.+/−2° F.

An example of a coating schedule table is shown below.

|  | Component | Wt (g) | Vol (ml) | Elapsed time (mm:ss) | End |
|---|---|---|---|---|---|
| Layer 1 | Polyol | 5.60 | 5.60 | 00:00 | 00:00 |
|  | MDI | 6.42 | 5.27 | 01:00 | 01:00 |
|  | Wax | 3.61 | 4.56 | 02:00 | 02:00 |
| Layer 2 | Polyol | 5.60 | 5.60 | 05:00 | 05:00 |
|  | MDI | 6.42 | 5.27 | 06:00 | 06:00 |
|  | Wax | 0.00 | 0.00 |  |  |
| Layer 3 | Polyol | 5.60 | 5.60 | 10:00 | 10:00 |
|  | MDI | 6.42 | 5.27 | 11:00 | 11:00 |
|  | Wax | 2.40 | 3.04 | 12:00 | 12:00 |
| Layer 4 | Polyol | 0.00 | 0.00 |  |  |
|  | MDI | 0.00 | 0.00 |  |  |
|  | Wax | 0.00 | 0.00 |  |  |
| Layer 5 | Polyol | 0.00 | 0.00 |  |  |
|  | MDI | 0.00 | 0.00 |  |  |
|  | Wax | 0.00 | 0.00 |  |  |
| Layer 6 | Polyol | 0.00 | 0.00 |  |  |
|  | MDI | 0.00 | 0.00 |  |  |
|  | Wax | 0.00 | 0.00 |  |  |
|  | Total Wt. | 42.07 g | | Heat off | 20:00 |
|  |  |  |  | Drum Stop | 27:00 |

Figure 4:
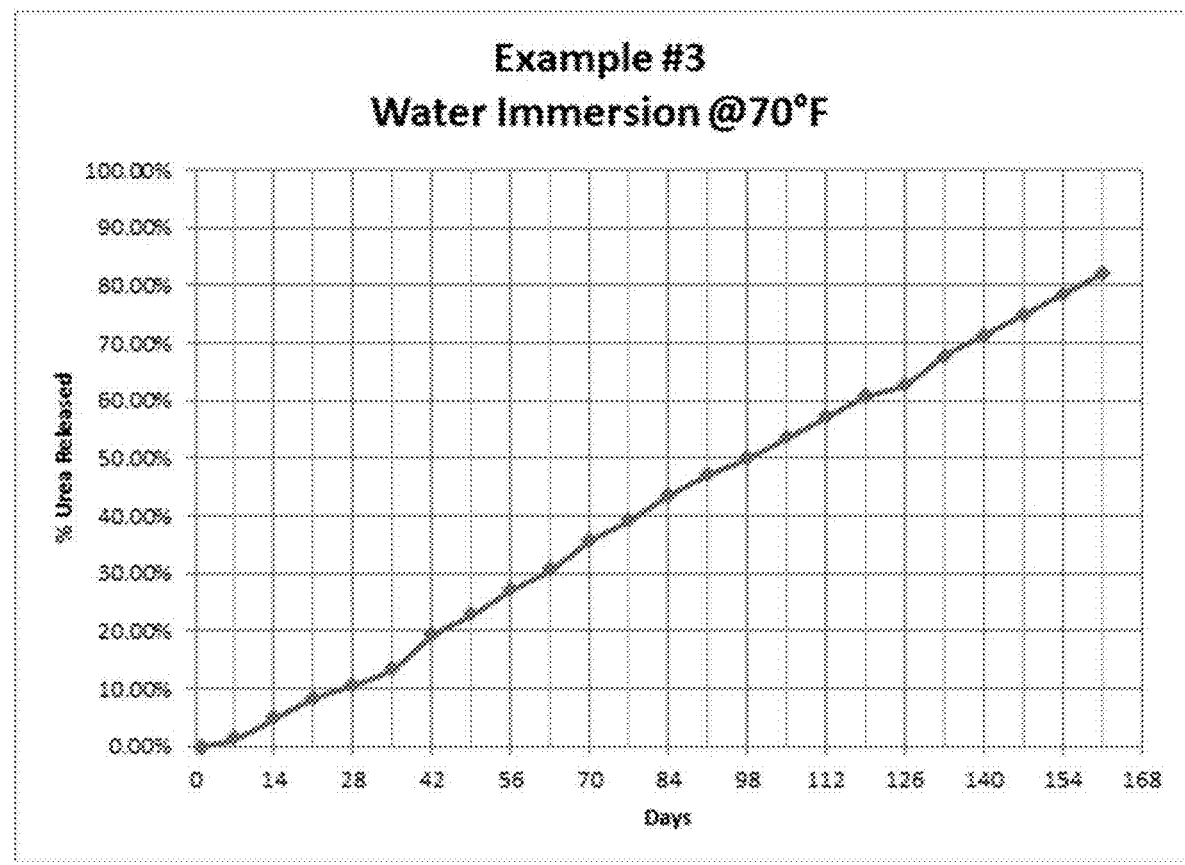
FIG. 4 is a graph plotting a dissolution of a third example of a coated granular fertilizer over several days.

FIG. 4 shows a graph plotting a dissolution curve of the coated granular fertilizer made in Example 3 as the coated granular fertilizer was immersed in water over several days.

EXAMPLE 4

A 2.15% total batch coating of granular urea (e.g., total coating in an amount of about 2.15 wt. % of the coated product (coated granular urea)), with a nominal size range of −5+10, was performed in a rotating drum. The drum dimensions were 14"×4". The drum was equipped with a removable front dam and had a 6" hole for easy access to the granular urea for liquids addition. The liquid precursors used to create the coating were 13.77 g of pMDI (4,4-diphenylmethane diisocyanate), 11.88 g of a 60/40 mixture of Polyol A and C, and 4.27 g C30+ alpha olefin wax. The pMDI:Polyol mass ratio used was 1.15:1. The total wax overcoat was 14.28% of the total coating weight. The coating drum was filled with 3 lbs of granular urea and run at 8.3 RPM. The urea was maintained at a temperature of 160±2° F. for the entirety of the coating test. The coating was placed onto the granular urea in three identical layers with the exception of wax. The wax was split 60:40 and placed on the first and third layers, respectively. There were five minutes between the polyol additions which allowed the precursors time to mix and fully react. After all liquid precursors were placed onto the granular urea, the liquid precursors and granular urea were allowed to cure and roll for 8 minutes+/−1 minute. A fan was then set up and blown on top of the rolling bed to cool the liquid precursors and granular urea, resulting in the coated granular material. The coated granular material reached a final temperature of 125° F.+/−2° F.

An example of a coating schedule table is shown below.

|  | Component | Wt (g) | Vol (ml) | Elapsed time (mm:ss) | End |
|---|---|---|---|---|---|
| Layer 1 | Polyol | 3.96 | 3.97 | 00:00 | 00:00 |
|  | MDI | 4.59 | 3.76 | 01:00 | 01:00 |
|  | Wax | 2.56 | 3.24 | 02:00 | 02:00 |
| Layer 2 | Polyol | 3.96 | 3.97 | 05:00 | 05:00 |
|  | MDI | 4.59 | 3.76 | 06:00 | 06:00 |
|  | Wax | 0.00 | 0.00 |  |  |
| Layer 3 | Polyol | 3.96 | 3.97 | 10:00 | 10:00 |
|  | MDI | 4.59 | 3.76 | 11:00 | 11:00 |
|  | Wax | 1.71 | 2.16 | 12:00 | 12:00 |
| Layer 4 | Polyol | 0.00 | 0.00 |  |  |
|  | MDI | 0.00 | 0.00 |  |  |
|  | Wax | 0.00 | 0.00 |  |  |
| Layer 5 | Polyol | 0.00 | 0.00 |  |  |
|  | MDI | 0.00 | 0.00 |  |  |
|  | Wax | 0.00 | 0.00 |  |  |
| Layer 6 | Polyol | 0.00 | 0.00 |  |  |
|  | MDI | 0.00 | 0.00 |  |  |
|  | Wax | 0.00 | 0.00 |  |  |
|  | Total Wt. | 29.92 g | Heat off | 20:00 |  |
|  |  |  | Drum Stop | 27:00 |  |

Figure 5:
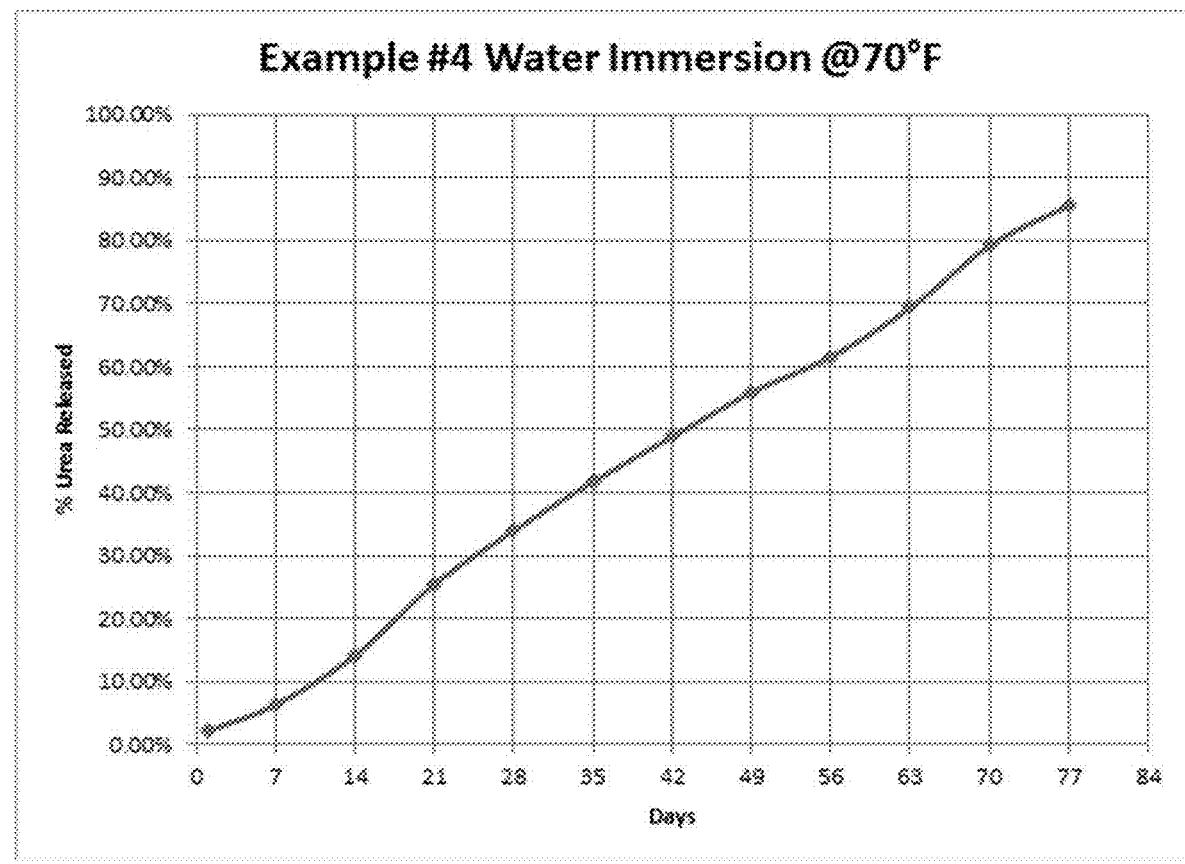
FIG. 5 is a graph plotting a dissolution of a fourth example of a coated granular fertilizer over several days.

FIG. 5 shows a graph plotting a dissolution curve of the coated granular fertilizer made in Example 4 as the coated granular fertilizer was immersed in water over several days.

EXAMPLE 5

A 5.00% total batch coating of granular calcium nitrate (CN) (e.g., total coating in an amount of about 5 wt. % of the coated product (coated granular CN)), with a nominal size range of −5+10, was performed in a rotating drum. The drum dimensions were 14"×4". The drum was equipped with a removable front dam and had a 6" hole for easy access to the granular CN for liquids addition. The liquid precursors used to create the coating were 45.16 g of pMDI (4,4-diphenylmethane diisocyanate), 36.68 g of a 60/40 mixture of Polyol A and C, and 13.64 g of a 50/50 mixture of C20-C24 and C30+ alpha olefin wax. The pMDI:Polyol mass ratio used was 1.23:1. The total wax overcoat was 14.28% of the total coating weight. The coating drum was filled with 4 lbs of granular CN and run at 8.3 RPM. The CN was maintained at a temperature of 130±2° F. for the entirety of the coating test. The coating was placed onto the granular CN in four identical layers with the exception of wax. The wax was placed on the first layer. There were five minutes between the polyol additions which allowed the precursors time to mix and fully react. After all liquid precursors were placed onto the granular CN, the liquid precursors and granular CN were allowed to cure and roll for 6 minutes+/−1 minute. A fan was then set up and blown on top of the rolling bed to cool the liquid precursors and granular CN, resulting in the coated granular material. The coated granular material reached a final temperature of 110° F.+/−2° F.

An example of a coating schedule table is shown below

|  | Component | Wt (g) | Vol (ml) | Elapsed time (mm:ss) | End |
|---|---|---|---|---|---|
| Layer 1 | Polyol | 9.17 | 8.84 | 00:00 | 00:15 |
|  | MDI | 11.29 | 9.25 | 00:30 | 00:45 |
|  | Wax | 13.64 | 17.26 | 01:00 | 01:15 |
| Layer 2 | Polyol | 9.17 | 8.84 | 05:00 | 05:15 |
|  | MDI | 11.29 | 9.25 | 05:30 | 05:45 |
|  | Wax | 0.00 | 0.00 |  |  |
| Layer 3 | Polyol | 9.17 | 8.84 | 10:00 | 10:15 |
|  | MDI | 11.29 | 9.25 | 10:30 | 10:45 |
|  | Wax | 0.00 | 0.00 | 11:00 | 11:15 |
| Layer 4 | Polyol | 9.17 | 8.84 | 15:00 | 15:15 |
|  | MDI | 11.29 | 9.25 | 15:30 | 15:45 |
|  | Wax | 0.00 | 0.00 | 16:00 | 16:15 |
| Layer 5 | Polyol | 0.00 | 0.00 |  |  |
|  | MDI | 0.00 | 0.00 |  |  |
|  | Wax | 0.00 | 0.00 |  |  |
| Layer 6 | Polyol | 0.00 | 0.00 |  |  |
|  | MDI | 0.00 | 0.00 |  |  |
|  | Wax | 0.00 | 0.00 |  |  |
|  | Total Wt. | 95.48 g | Heat off | 25:00 |  |
|  |  |  | Drum Stop | 40:00 |  |

Figure 6:
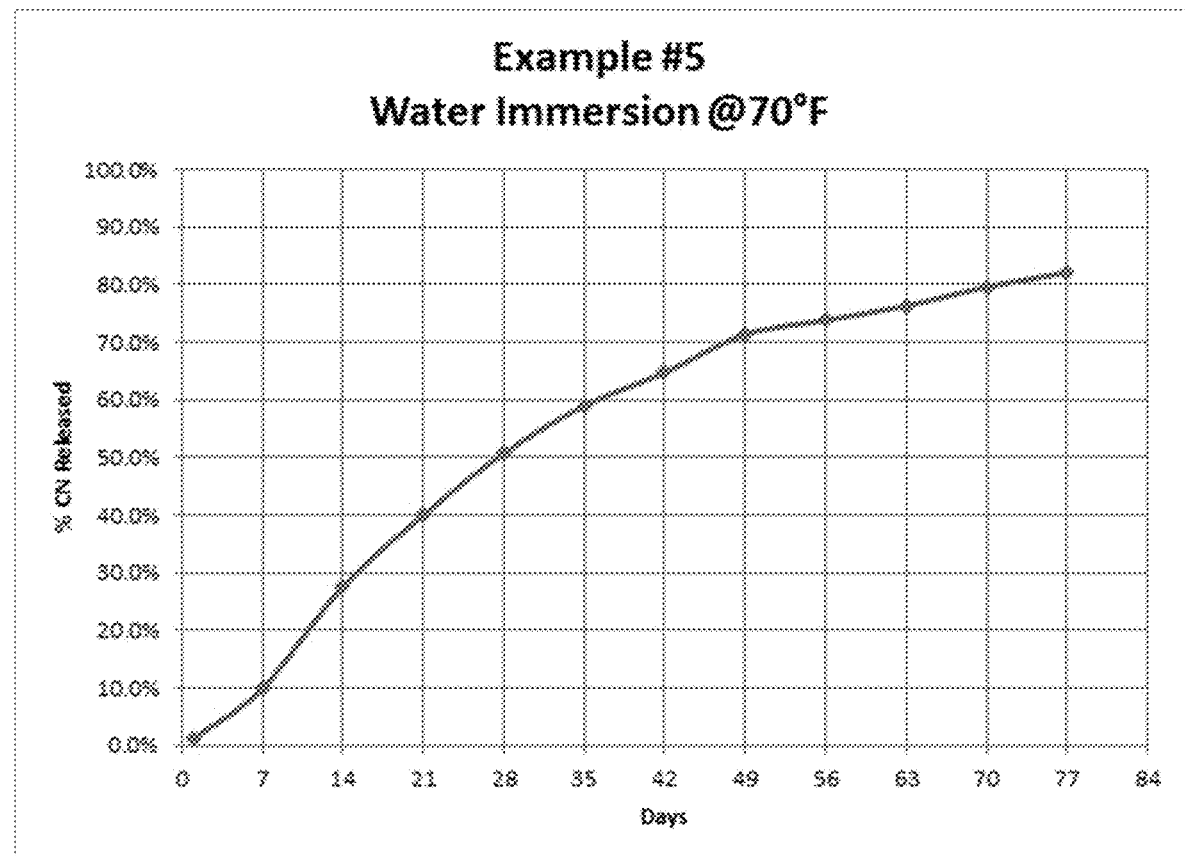
FIG. 6 is a graph plotting a dissolution of a fifth example of a coated granular fertilizer over several days.

FIG. 6 shows a graph plotting a dissolution curve of the coated granular fertilizer made in Example 5 as the coated granular fertilizer was immersed in water over several days.

EXAMPLE 6

A 5.00% total batch coating of granular calcium nitrate (CN) (e.g., total coating in an amount of about 5 wt. % of the coated product (coated granular CN)), with a nominal size range of −5+10, was performed in a rotating drum. The drum dimensions were 14"×4". The drum was equipped with a removable front dam and had a 6" hole for easy access to the granular CN for liquids addition. The liquid precursors used to create the coating were 37.56 g of pMDI (4,4-diphenylmethane diisocyanate), 44.28 g of a 75/25 mixture of Polyol A and C, and 13.64 g of a 50/50 mixture of C20-C24 and C30+ alpha olefin wax. The pMDI:Polyol mass ratio used was 0.848:1. The total wax overcoat was 14.28% of the total coating weight. The coating drum was filled with 4 lbs of granular CN and run at 8.3 RPM. The CN was maintained at a temperature of 130±2° F. for the entirety of the coating test. The coating was placed onto the granular CN in three identical layers with the exception of wax. The wax was split 60:40 and placed on the first and third layers, respectively. There were four minutes between the polyol additions which allowed the precursors time to mix and fully react. After all liquid precursors were placed onto the granular CN, the liquid precursors and granular CN were allowed to cure and roll for 8 minutes+/−1 minute. A fan was then set up and blown on top of the rolling bed to cool the liquid precursors and granular CN resulting in the coated granular material. The coated granular material reached a final temperature of 110° F.+/−2° F.

An example of a coating schedule table is shown below

|  | Component | Wt (g) | Vol (ml) | Elapsed time (mm:ss) | End |
|---|---|---|---|---|---|
| Layer 1 | Polyol | 14.76 | 15.02 | 00:00 | 00:15 |
|  | MDI | 12.52 | 10.27 | 00:30 | 00:45 |
|  | Wax | 8.18 | 10.36 | 00:50 | 01:05 |
| Layer 2 | Polyol | 14.76 | 15.02 | 04:00 | 04:15 |
|  | MDI | 12.52 | 10.27 | 04:30 | 04:45 |
|  | Wax | 0.00 | 0.00 |  |  |
| Layer 3 | Polyol | 14.76 | 15.02 | 08:00 | 08:15 |
|  | MDI | 12.52 | 10.27 | 08:30 | 08:45 |
|  | Wax | 5.45 | 6.90 | 08:50 | 09:05 |
| Layer 4 | Polyol | 0.00 | 0.00 |  |  |
|  | MDI | 0.00 | 0.00 |  |  |
|  | Wax | 0.00 | 0.00 |  |  |
| Layer 5 | Polyol | 0.00 | 0.00 |  |  |
|  | MDI | 0.00 | 0.00 |  |  |
|  | Wax | 0.00 | 0.00 |  |  |
| Layer 6 | Polyol | 0.00 | 0.00 |  |  |
|  | MDI | 0.00 | 0.00 |  |  |
|  | Wax | 0.00 | 0.00 |  |  |
|  | Total Wt. | 95.47 g | Heat off | 16:00 |  |
|  |  |  | Drum Stop | 28:00 |  |

Figure 7:
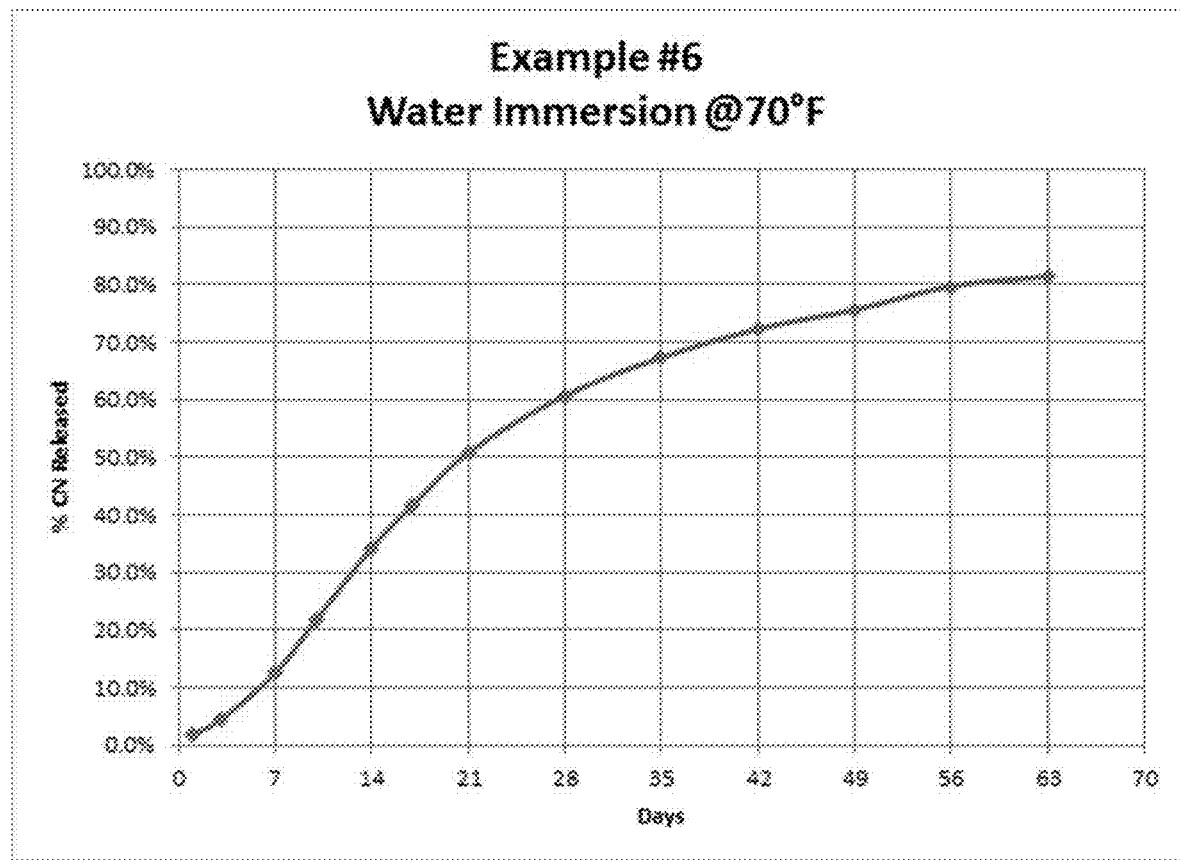
FIG. 7 is a graph plotting a dissolution of a sixth example of a coated granular fertilizer over several days.

FIG. 7 shows a graph plotting a dissolution curve of the coated granular fertilizer made in Example 6 as the coated granular fertilizer was immersed in water over several days.

EXAMPLE 7

A 5.00% total batch coating of granular calcium nitrate (CN) (e.g., total coating in an amount of about 5 wt. % of the coated product (coated granular CN)), with a nominal size range of −5+10, was performed in a rotating drum. The drum dimensions were 14"×4". The drum was equipped with a removable front dam and had a 6" hole for easy access to the granular CN for liquids addition. The liquid precursors used to create the coating were 45.75 g of pMDI (4,4-diphenylmethane diisocyanate), 36.09 g of a 50/50 mixture of Polyol A and C, and 13.64 g of a 50/50 mixture of C20-C24 and C30+ alpha olefin wax. The pMDI:Polyol mass ratio used was 1.27:1. The total wax overcoat was 14.28% of the total coating weight. The coating drum was filled with 4 lbs of granular CN and run at 8.3 RPM. The CN was maintained at a temperature of 130±2° F. for the entirety of the coating test. The coating was placed onto the granular CN in three identical layers with the exception of wax. The wax was split 60:40 and placed on the first and third layers, respectively. There were four minutes between the polyol additions which allowed the precursors time to mix and fully react. After all liquid precursors were placed onto the granular CN, the liquid precursors and granular CN were allowed to cure and roll for 8 minutes+/−1 minute. A fan was then set up and blown on top of the rolling bed to cool the liquid precursors and granular CN resulting in the coated granular material. The coated granular material reached a final temperature of 110° F.+/−2° F.

An example of a coating schedule table is shown below

|  | Component | Wt (g) | Vol (ml) | Elapsed time (mm:ss) | End |
|---|---|---|---|---|---|
| Layer 1 | Polyol | 12.03 | 11.97 | 00:00 | 00:15 |
|  | MDI | 15.25 | 12.50 | 00:30 | 00:45 |
|  | Wax | 8.18 | 10.36 | 00:50 | 01:05 |
| Layer 2 | Polyol | 12.03 | 11.97 | 04:00 | 04:15 |
|  | MDI | 15.25 | 12.50 | 04:30 | 04:45 |
|  | Wax | 0.00 | 0.00 |  |  |
| Layer 3 | Polyol | 12.03 | 11.97 | 08:00 | 08:15 |
|  | MDI | 15.25 | 12.50 | 08:30 | 08:45 |
|  | Wax | 5.45 | 6.90 | 08:50 | 09:05 |
| Layer 4 | Polyol | 0.00 | 0.00 |  |  |
|  | MDI | 0.00 | 0.00 |  |  |
|  | Wax | 0.00 | 0.00 |  |  |
| Layer 5 | Polyol | 0.00 | 0.00 |  |  |
|  | MDI | 0.00 | 0.00 |  |  |
|  | Wax | 0.00 | 0.00 |  |  |
| Layer 6 | Polyol | 0.00 | 0.00 |  |  |
|  | MDI | 0.00 | 0.00 |  |  |
|  | Wax | 0.00 | 0.00 |  |  |
|  | Total Wt. | 95.47 g | Heat off | 16:00 |  |
|  |  |  | Drum Stop | 28:00 |  |

Figure 8:
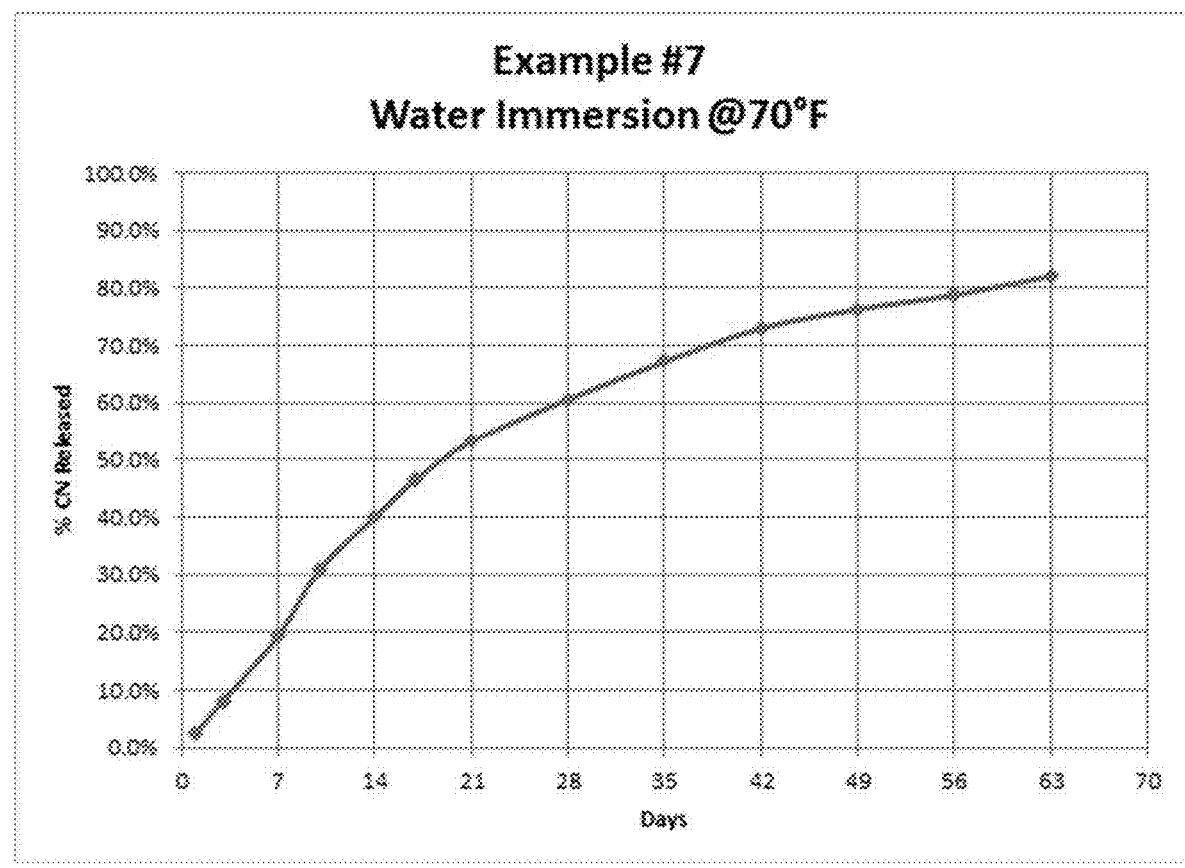
FIG. 8 is a graph plotting a dissolution of a seventh example of a coated granular fertilizer over several days.

FIG. 8 shows a graph plotting a dissolution curve of the coated granular fertilizer made in Example 7 as the coated granular fertilizer was immersed in water over several days.

EXAMPLE 8

A 5.00% total batch coating of granular calcium nitrate (CN) (e.g., total coating in an amount of about 5 wt. % of the coated product (coated granular CN)), with a nominal size range of −5+10, was performed in a rotating drum. The drum dimensions were 14"×4". The drum was equipped with a removable front dam and had a 6" hole for easy access to the granular CN for liquids addition. The liquid precursors used to create the coating were 43.04 g of pMDI (4,4-diphenylmethane diisocyanate), 38.84 g of a 60/40 mixture of Polyol A and C, and 13.64 g of a 50/50 mixture of C20-C24 and C30+ alpha olefin wax. The pMDI:Polyol mass ratio used was 1.11:1. The total wax overcoat was 14.28% of the total coating weight. The coating drum was filled with 4 lbs of granular CN and run at 8.3 RPM. The CN was maintained at a temperature of 130±2° F. for the entirety of the coating test. The coating was placed onto the granular CN in three identical layers with the exception of wax. The wax was split 60:20:20 and placed on the first, third, and fourth layers respectively. There were five minutes between the polyol additions which allowed the precursors time to mix and fully react. After all liquid precursors were placed onto the granular CN, the liquid precursors and granular CN were allowed to cure and roll for 10 minutes+/−1 minute. A fan was then set up and blown on top of the rolling bed to cool the liquid precursors and granular CN resulting in the coated granular material. The coated granular material reached a final temperature of 110° F.+/−2° F.

An example of a coating schedule table is shown below

|  | Component | Wt (g) | Vol (ml) | Elapsed time (mm:ss) | End |
|---|---|---|---|---|---|
| Layer 1 | Polyol | 9.71 | 9.75 | 00:00 | 00:15 |
|  | MDI | 10.76 | 8.75 | 00:30 | 00:45 |
|  | Wax | 6.82 | 8.63 | 01:00 | 01:15 |
| Layer 2 | Polyol | 9.71 | 9.75 | 05:00 | 05:15 |
|  | MDI | 10.76 | 8.75 | 05:30 | 05:45 |
|  | Wax | 0.00 | 0.00 |  |  |
| Layer 3 | Polyol | 9.71 | 9.75 | 10:00 | 10:15 |
|  | MDI | 10.76 | 8.75 | 10:30 | 10:45 |
|  | Wax | 3.41 | 4.32 | 11:00 | 11:15 |
| Layer 4 | Polyol | 9.71 | 9.75 | 15:00 | 15:15 |
|  | MDI | 10.76 | 8.75 | 15:30 | 15:45 |
|  | Wax | 3.41 | 4.32 | 16:00 | 16:15 |

-continued

| | Component | Wt (g) | Vol (ml) | Elapsed time (mm:ss) | End |
|---|---|---|---|---|---|
| Layer 5 | Polyol | 0.00 | 0.00 | | |
| | MDI | 0.00 | 0.00 | | |
| | Wax | 0.00 | 0.00 | | |
| Layer 6 | Polyol | 0.00 | 0.00 | | |
| | MDI | 0.00 | 0.00 | | |
| | Wax | 0.00 | 0.00 | | |
| | Total Wt. | 95.52 g | | Heat off | 25:00 |
| | | | | Drum Stop | 40:00 |

Figure 9:
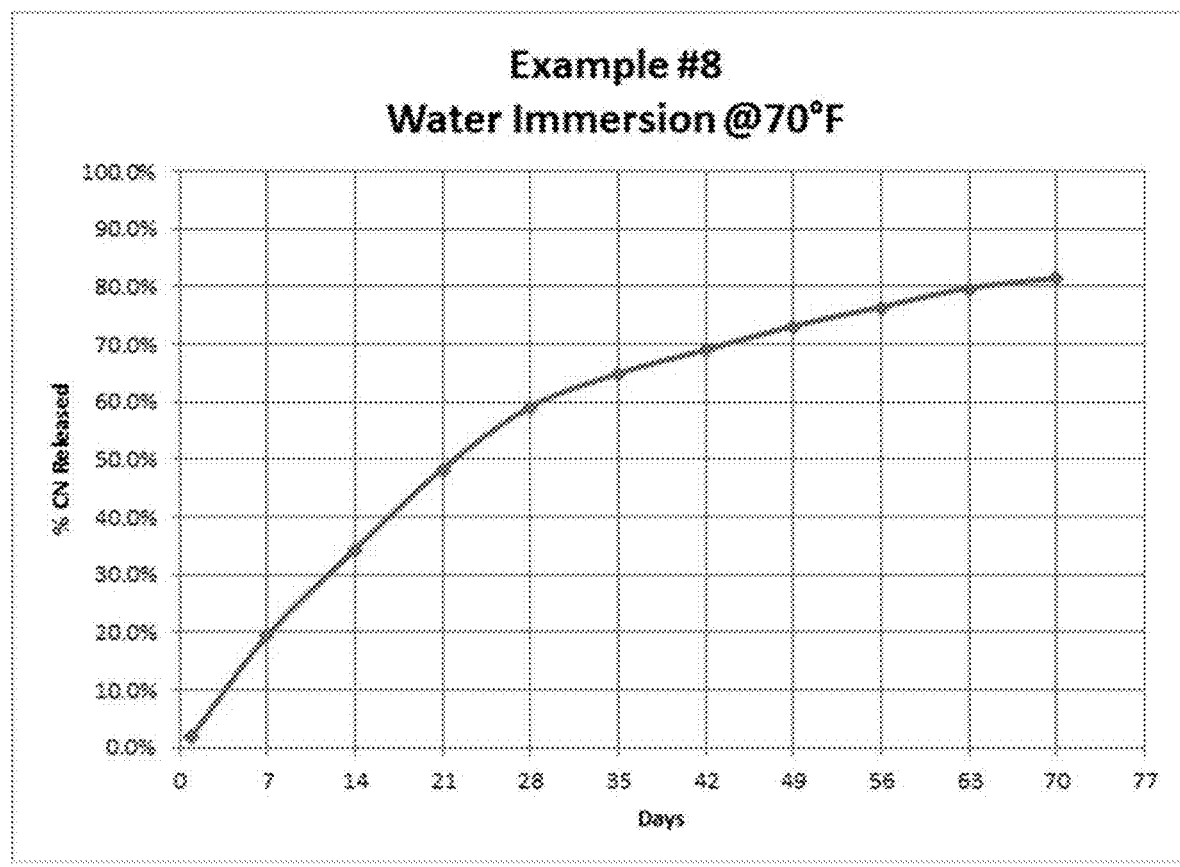
FIG. 9 is a graph plotting a dissolution of an eighth example of a coated granular fertilizer over several days.

FIG. 9 shows a graph plotting a dissolution curve of the coated granular fertilizer made in Example 8 as the coated granular fertilizer was immersed in water over several days.

EXAMPLE 9

A 10.00% total batch coating of granular calcium nitrate (CN) (e.g., total coating in an amount of about 10 wt. % of the coated product (coated granular CN)), with a nominal size range of −5+10, was performed in a rotating drum. The drum dimensions were 14×"×4". The drum was equipped with a removable front dam and had a 6" hole for easy access to the granular CN for liquids addition. The liquid precursors used to create the coating were 90.84 g of pMDI (4,4-diphenylmethane diisocyanate), 81.96 g of a 60/40 mixture of Polyol A and C, and 28.80 g of a 50/50 mixture of C20-C24 and C30+ alpha olefin wax. The pMDI:Polyol mass ratio used was 1.11:1. The total wax overcoat was 14.28% of the total coating weight. The coating drum was filled with 4 lbs of granular CN and run at 8.3 RPM. The CN was maintained at a temperature of 130±2° F. for the entirety of the coating test. The coating was placed onto the granular CN in six identical layers with the exception of wax. The wax was split 30:20:30:20 and placed on the first, third, fourth, and sixth layers, respectively. There were four and a half minutes between the polyol additions which allowed the precursors time to mix and fully react. After all liquid precursors were placed onto the granular CN, the liquid precursors and granular CN were allowed to cure and roll for 9 minutes+/−1 minute. A fan was then set up and blown on top of the rolling bed to cool the liquid precursors and granular CN resulting in the coated granular material. The coated granular material reached a final temperature of 110° F.+/−2° F.

An example of a coating schedule table is shown below

| | Component | Wt (g) | Vol (ml) | Elapsed time (mm:ss) | End |
|---|---|---|---|---|---|
| Layer 1 | Polyol | 13.66 | 9.75 | 00:00 | 00:15 |
| | MDI | 15.14 | 8.75 | 00:30 | 00:45 |
| | Wax | 8.64 | 10.93 | 01:00 | 01:15 |
| Layer 2 | Polyol | 13.66 | 9.75 | 04:30 | 04:45 |
| | MDI | 15.14 | 8.75 | 05:00 | 05:15 |
| | Wax | 0.00 | 0.00 | | |
| Layer 3 | Polyol | 13.66 | 9.75 | 09:00 | 09:15 |
| | MDI | 15.14 | 8.75 | 09:30 | 09:45 |
| | Wax | 5.76 | 7.29 | 10:00 | 10:15 |
| Layer 4 | Polyol | 13.66 | 9.75 | 13:30 | 13:45 |
| | MDI | 15.14 | 8.75 | 14:00 | 14:15 |
| | Wax | 8.64 | 10.93 | 14:30 | 14:45 |
| Layer 5 | Polyol | 13.66 | 14.23 | 18:00 | 18:15 |
| | MDI | 15.14 | 12.41 | 18:30 | 18:45 |
| | Wax | 3.41 | 4.32 | 19:00 | 19:15 |

-continued

| | Component | Wt (g) | Vol (ml) | Elapsed time (mm:ss) | End |
|---|---|---|---|---|---|
| Layer 6 | Polyol | 13.66 | 14.23 | 22:30 | 22:45 |
| | MDI | 15.14 | 12.41 | 23:00 | 23:15 |
| | Wax | 5.76 | 7.29 | 23:30 | 23:45 |
| | Total Wt. | 205.01 g | | Heat off | 31:30 |
| | | | | Drum Stop | 38:30 |

Figure 10:
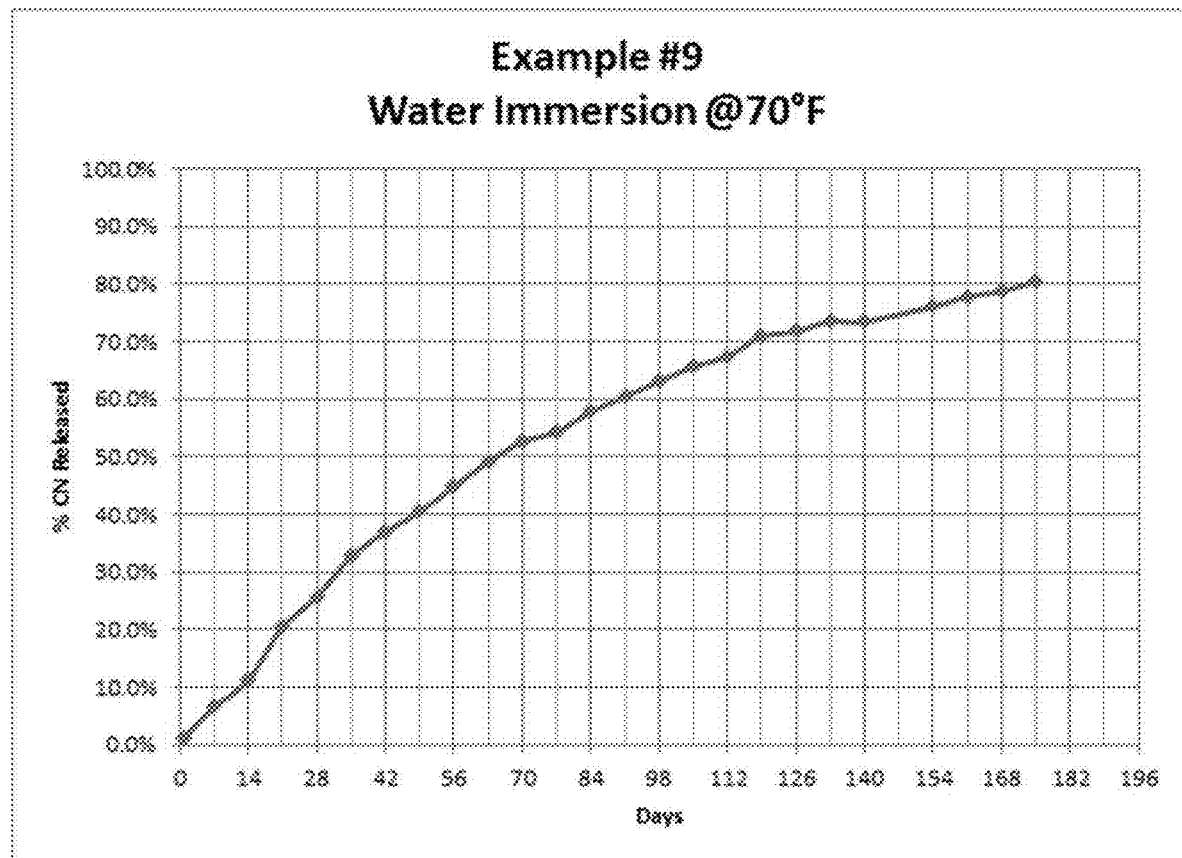
FIG. 10 is a graph plotting a dissolution of a ninth example of a coated granular fertilizer over several days.

FIG. 10 shows a graph plotting a dissolution curve of the coated granular fertilizer made in Example 9 as the coated granular fertilizer was immersed in water over several days.

EXAMPLE 10

Figure 11:
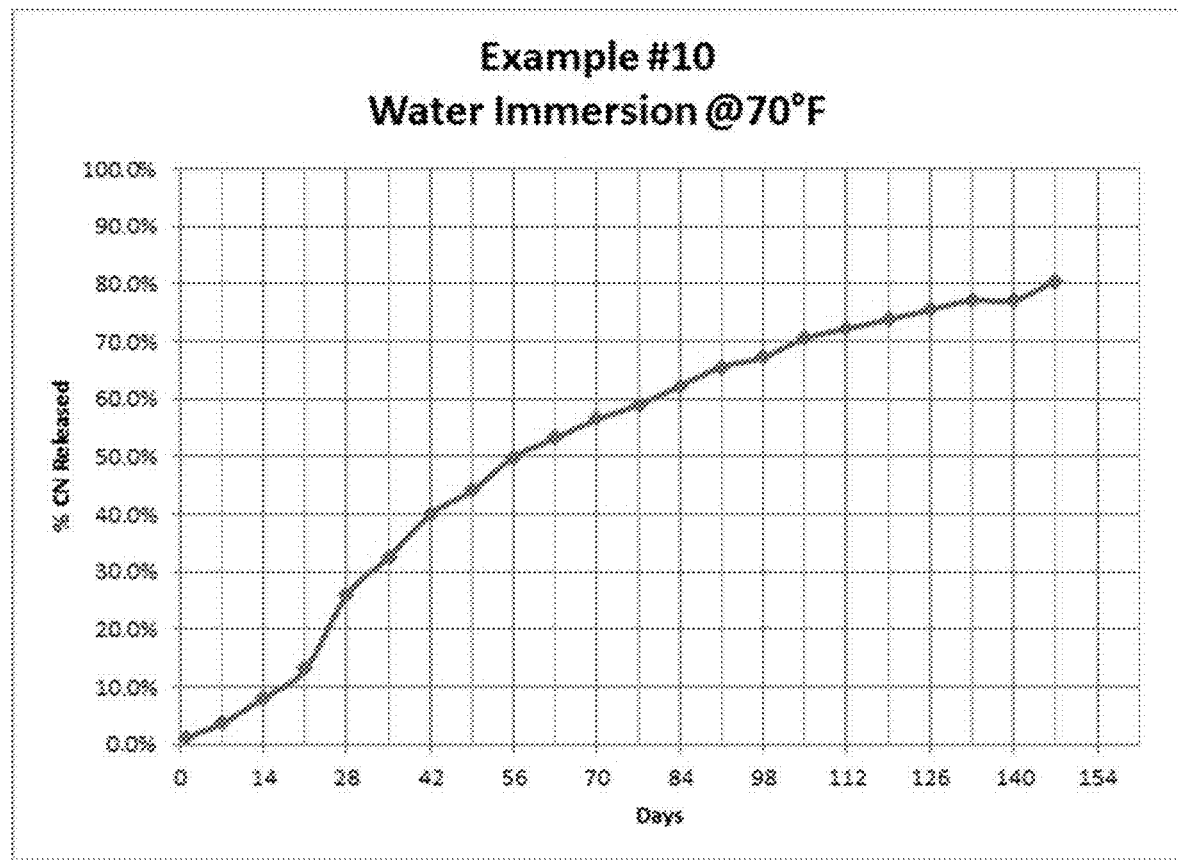
FIG. 11 is a graph plotting a dissolution of a tenth example of a coated granular fertilizer over several days.

A continuous coating of granular calcium nitrate (CN), with a nominal size range of −5+10, was performed in a rotating drum. Its dimensions were 2'×5' for the coating section, 2'×9" for the cooling section, and 2'×6.5" for the screener section. The liquid precursors used to create the coating were pMDI (4,4-diphenylmethane diisocyanate), a 60/40 mixture of Polyol A and C, and a 50:50 mixture of C20-C24 and C30+ HA wax. The pMDI:Polyol mass ratio used was 1.11:1. The total wax overcoat was 14.28% of the total coating weight. The coating apparatus was run at 6 RPM with the CN feed rate set at 400 PPH. The coating apparatus had a 5" end dam ring installed which facilitated achieving a retention weight of 155 lbs and a total retention time of 23.5 minutes. The CN was introduced into the coating apparatus at 140° F. Substrate temperature was maintained at 140±3° F. through the entirety of the coating apparatus. Three pairs of nozzles (8 total nozzles) are placed above the surface of the rolling bed of CN. The first and third pair of nozzles includes a pMDI, polyol, and wax nozzle. The second pair includes a pMDI and polyol nozzle. Each nozzle pair was spaced to achieve approximately 5 minutes of retention between each for curing. Each liquid was metered in specific quantities to achieve a total product coating of 5.00% (wt. %). The wax was split 40:60 on the first and third nozzle pairs, respectively. After the final nozzle pair there was 8.5 minutes+/−1 minute of retention for curing and cooling. After the coated granules were cooled they entered the rotary screener and were then bagged. This coating test was performed for 1 hour and 20 minutes. FIG. 11 shows a graph plotting a dissolution curve of the coated granular fertilizer made in Example 10 as the coated granular fertilizer was immersed in water over several days.

EXAMPLE 11

A 5% total batch coating of granular Calcium Nitrate with nominal size range of −5+10 Tyler Mesh was performed at in a 14" diameter rotating drum with a depth of 4" as described in the previous examples. The liquid precursors employed to create this coating were 46.40 g of pMDI, 35.44 g of a 1:3 mixture of Polyol A:Polyol B and 13.64 g of a 1:1 mixture of C20-C24 and C30+ alpha olefin waxes. The coating drum was charged with 4 lbs of granular Calcium Nitrate and rotated at a speed of 8.3 RPM. The drum and contents were maintained at 130+/−2° F. for the duration of the liquid application times. The coating was applied in 3 equally split layers except all wax was split 40:60 between layers 1 and 3. There were 5 minutes between pMDI applications and 30 seconds between individual layer components. The final layer was allowed to cure for 10 minutes. After all liquid precursors were placed onto the granular CN, the liquid precursors and granular CN were allowed to cure and roll for 15 minutes+/−1 minute. A fan was then set up and blown on top of the rolling bed to cool the liquid precursors and granular CN resulting in the coated granular material. The coated granular material reached a final temperature of 109° F.+/−2° F.

An example of a coating schedule table is shown below:

|  | Component | Wt (g) | Vol (ml) | Elapsed time (mm:ss) | End |
|---|---|---|---|---|---|
| Layer 1 | MDI | 14.48 | 11.87 | 00:00 | 00:00 |
|  | Polyol | 12.81 | 12.37 | 00:30 | 00:30 |
|  | Wax | 5.45 | 6.90 | 00:30 | 00:30 |
| Layer 2 | MDI | 14.48 | 11.87 | 05:00 | 05:00 |
|  | Polyol | 12.81 | 12.37 | 05:30 | 05:30 |
|  | Wax | 0.00 | 0.00 |  |  |
| Layer 3 | MDI | 14.48 | 11.87 | 10:00 | 10:00 |
|  | Polyol | 12.81 | 12.37 | 10:30 | 10:30 |
|  | Wax | 8.18 | 10.36 | 10:30 | 10:30 |
| Layer 4 | MDI | 0.00 | 0.00 |  |  |
|  | Polyol | 0.00 | 0.00 |  |  |
|  | Wax | 0.00 | 0.00 |  |  |
| Layer 5 | MDI | 0.00 | 0.00 |  |  |
|  | Polyol | 0.00 | 0.00 |  |  |
|  | Wax | 0.00 | 0.00 |  |  |
| Layer 6 | MDI | 0.00 | 0.00 |  |  |
|  | Polyol | 0.00 | 0.00 |  |  |
|  | Wax | 0.00 | 0.00 |  |  |
|  | Total Wt. | 95.49 g | Heat off | 20:00 |  |
|  |  |  | Drum Stop | 35:00 |  |

Figure 12:
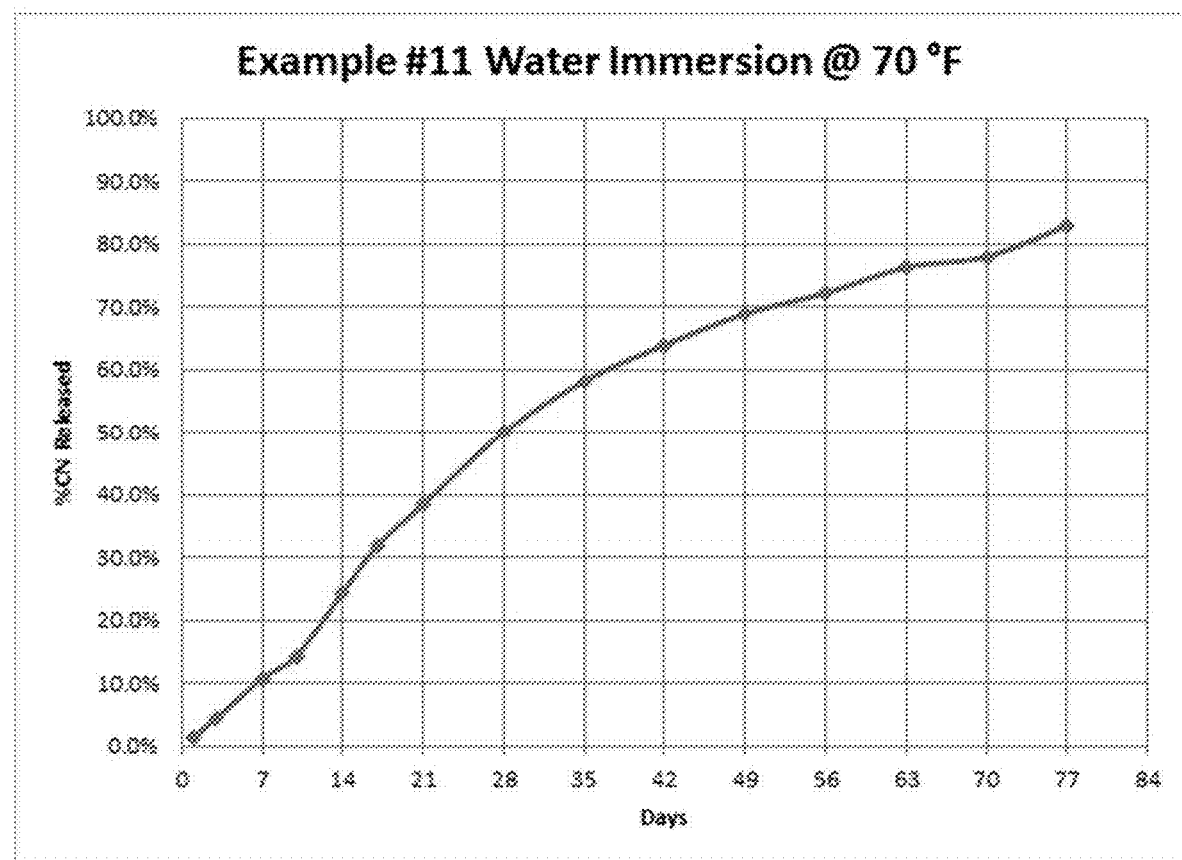
FIG. 12 is a graph plotting a dissolution of an eleventh example of a coated granular fertilizer over several days.

FIG. 12 shows a graph plotting a dissolution curve of the coated granular fertilizer made in Example 11 as the coated granular fertilizer was immersed in water over several days.

EXAMPLE 12

A 5% total batch coating of granular Calcium Nitrate with nominal size range of −5+10 Tyler Mesh was performed at in a 14" diameter rotating drum with a depth of 4" as described in the previous examples. The liquid precursors employed to create this coating were 46.40 g of pMDI, 35.44 g of a 60:40 mixture of Polyol D:Polyol C and 13.64 g of a 50:50 mixture of C20-C24 and C30+ alpha olefin waxes. The coating drum was charged with 4 lbs of granular Calcium Nitrate and rotated at a speed of 8.3 RPM. The drum and contents were maintained at 130+/−2° F. for the duration of the liquid application times. The coating was applied in 4 equally split layers except all wax was applied in a single layer. There were 5 minutes between pMDI applications and 30 seconds between individual layer components. The final layer was allowed to cure for 10 minutes. After all liquid precursors were placed onto the granular CN, the liquid precursors and granular CN were allowed to cure and roll for 15 minutes+/−1 minute. A fan was then set up and blown on top of the rolling bed to cool the liquid precursors and granular CN resulting in the coated granular material. The coated granular material reached a final temperature of 109° F.+/−2° F.

An example of a coating schedule and dissolution data table are shown below:

|  | Component | Wt (g) | Vol (ml) | Elapsed time (mm:ss) | End |
|---|---|---|---|---|---|
| Layer 1 | MDI | 11.60 | 9.51 | 00:00 | 00:00 |
|  | Polyol | 8.86 | 8.54 | 00:30 | 00:30 |
|  | Wax | 0.00 | 0.00 | 00:30 | 00:30 |
| Layer 2 | MDI | 11.60 | 9.51 | 05:00 | 05:00 |
|  | Polyol | 8.86 | 8.54 | 05:30 | 05:30 |
|  | Wax | 0.00 | 0.00 |  |  |
| Layer 3 | MDI | 11.60 | 9.51 | 10:00 | 10:00 |
|  | Polyol | 8.86 | 8.54 | 10:30 | 10:30 |
|  | Wax | 0.00 | 0.00 | 10:30 | 10:30 |
| Layer 4 | MDI | 11.60 | 9.51 | 15:00 | 15:00 |
|  | Polyol | 8.86 | 8.54 | 15:30 | 15:30 |
|  | Wax | 13.64 | 17.26 | 15:30 | 15:30 |
| Layer 5 | MDI | 0.00 | 0.00 |  |  |
|  | Polyol | 0.00 | 0.00 |  |  |
|  | Wax | 0.00 | 0.00 |  |  |
| Layer 6 | MDI | 0.00 | 0.00 |  |  |
|  | Polyol | 0.00 | 0.00 |  |  |
|  | Wax | 0.00 | 0.00 |  |  |
|  | Total Wt. | 95.49 g | Heat off | 25:00 |  |
|  |  |  | Drum Stop | 40:00 |  |

Figure 13:
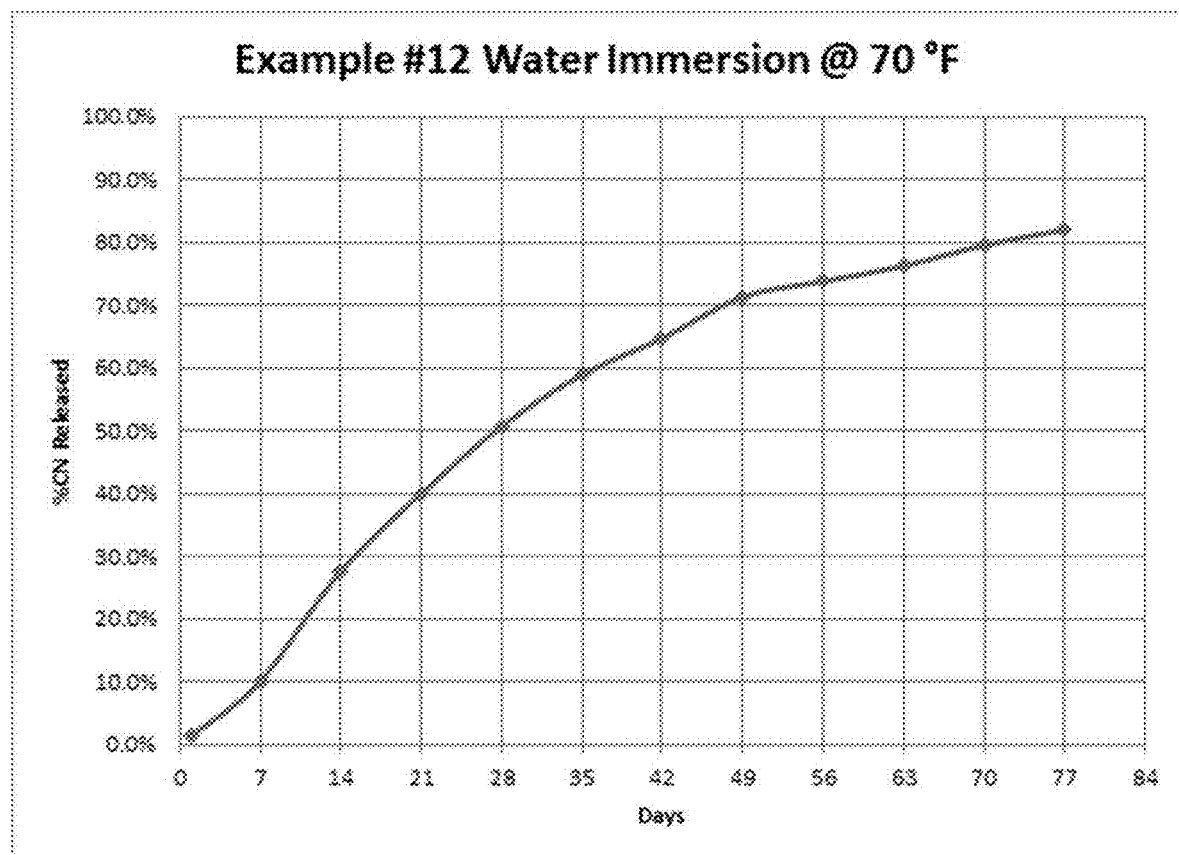
FIG. 13 is a graph plotting a dissolution of a twelfth example of a coated granular fertilizer over several days.

FIG. 13 shows a graph plotting a dissolution curve of the coated granular fertilizer made in Example 12 as the coated granular fertilizer was immersed in water over several days.

As shown in Table 1 and Table 2 below, the polyester polyol may be, for example, castor oil or castor oil derivatives. Alternatively or in addition, as shown in Table 1 and Table 2, the polyether polyol may be, for example, aliphatic glycerine initiated polyether polyol, aliphatic amine initiated trifunctional polol, or ethylene diamine having been propoxylated, ethoxylated, or combinations thereof.

Table 1 of Polyol Properties including example Values:

|  | Polyol A | Polyol B | Polyol C | Polyol D |
|---|---|---|---|---|
| Chemical Name and/or commercially available examples | Castor oil | Jeffol A-630 | Ethylene diamine alkoxylate, Ethoxylated propoxylated ethylene diamine, Poly Q40-800 | Hydroxyl terminated poly (oxyalkylene), Poly G30-240 |
| Type | Polyester | Polyether | Polyether | Polyether |
| Example CAS# | 8001-79-4 | 26316-40-5 | 25791-96-2 |  |
| MW, nominal | 927 | 350 | 280 | 700 |
| Functionality | 2.7 | 3 | 4 | 3 |
| Equivalent Wt | 343.3 | 90 | 70 | 233.3 |
| Hydroxyl Number | 160 | 630 | 800 | 240 |

-continued

|  | Polyol A | Polyol B | Polyol C | Polyol D |
|---|---|---|---|---|
| Density, lb/ft3, 25C | 59.90 | 67.39 | 65.52 | 64.27 |
| Specific Gravity | 0.96 | 1.08 | 1.05 | 1.03 |
| Viscosity (25 C.), cP | 650 | 430 | 18000 | 270 |
| Catalytic amine group present? | No | Yes | Yes | No |
| Synthesis Method | N/A, naturally occuring seed oil | Aliphatic amine initiated, alkylene oxide addition to triethanolamine | Aliphatic amine initiated, i.e. produced by alkoxylation of ethylene diamine, specifically ethoxylation and propoxylation | Glycerol initiated, addition of propylene oxide to glycerine |

Table 2 of Polyol Properties including example Ranges:

|  | Polyol A | Polyol B | Polyol C | Polyol D |
|---|---|---|---|---|
| Chemical Name and/or commercially available examples | Castor oil | Jeffol A-630 | Ethylene diamine alkoxylate, Ethoxylated propoxylated ethylene diamine, Poly Q40-800 | Hydroxyl terminated poly (oxyalkylene), Poly G30-240 |
| Type | Polyester | Polyether | Polyether | Polyether |
| Example CAS# | 8001-79-4 |  | 26316-40-5 | 25791-96-2 |
| MW, nominal | 900-1000 | 300-400 | 240-320 | 500-1200 |
| Functionality | 2.5-3 | 2.9-3.1 | 3.9-4 | 2.5-3.5 |
| Equivalent Wt | 310-380 | 60-120 | 50-90 | 180-290 |
| Hydroxyl Number | 130-180 | 550-680 | 750-850 | 200-320 |
| Density, lb/ft3, 25C | 58-62 | 62-70 | 63-67 | 62-72 |
| Specific Gravity | .9-1.1 | 1-1.12 | 1-1.1 | .99-1.2 |
| Viscosity (25 C.), cP | 550-750 | 300-500 | 10000-50000 | 120-1050 |
| Catalytic amine group present? | No | Yes | Yes | No |
| Synthesis Method | N/A, naturally occuring seed oil | Aliphatic amine initiated, alkylene oxide addition to triethanolamine | Aliphatic amine initiated, i.e. produced by alkoxylation of ethylene diamine, specifically ethoxylation and propoxylation | Glycerol initiated, addition of propylene oxide to glycerine |

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A method for coating a granular material, the method comprising:
   applying one or more layers of a coating on the granular material, wherein the coating comprises:
   a diisocyanate;
   at least one of a polyester polyol or a polyether polyol; and
   optionally a wax; and
   reacting the coating on the granular material to form a coated granular material.

2. The method according to aspect 1, wherein the polyester polyol comprises at least one of a castor oil or a castor oil derivative, and the polyether polyol comprises at least one of an aliphatic glycerine initiated polyether polyol, an aliphatic amine initiated trifunctional polyol, or an ethylene diamine, the ethylene diamine having been propoxylated or ethoxylated.

3. The method according to any of aspects 1 to 2, further comprising applying the one or more layers of the coating on the granular material at a temperature of between 120° F. and 170° F.

4. The method according to any of aspects 1 to 3, wherein the coating is a first coating, the polyester polyol is a first polyester polyol, and the polyether polyol is a first polyether polyol, and wherein the method further comprises applying one or more layers of a second coating on the granular material, wherein the second coating comprises:
the diisocyanate;
at least one of a second polyester polyol or a second polyether polyol, the second polyester polyol having a different chemical formula than the first polyester polyol and the second polyether polyol having a different chemical formula than the first polyether polyol; and
optionally the wax.

5. The method of any of aspects 1 to 4, wherein the applying one or more layers of the coating on the granular material comprises a residence time of between 2 and 7 minutes per layer.

6. The method of any of aspects 1 to 5, wherein the coated granular material comprises the coating in an amount between 1% and 20% by weight of the coated granular material, inclusively.

7. A coating for a granular material, the coating comprising:
a diisocyanate;
a polyester polyol, a polyether polyol, or a polyol mix, the polyol mix comprising the polyester polyol, the polyether polyol, or combinations thereof; and
optionally a wax.

8. The coating of aspect 7, wherein the polyester polyol comprises a castor oil or a castor oil derivative, and the polyether polyol comprises an aliphatic glycerine initiated polyether polyol, an aliphatic amine initiated trifunctional polyol, or an ethylene diamine, the ethylene diamine having been propoxylated or ethoxylated.

9. The coating of aspect 8, wherein the coating comprises the polyol mix, the polyol mix comprising the ethylene diamine and a composition selected from the group consisting of the castor oil, the castor oil derivatives, the aliphatic glycerine initiated polyether polyol, and mixtures thereof.

10. The coating of aspect 9, wherein the polyol mix comprises the aliphatic glycerine initiated polyether polyol.

11. The coating of any of aspects 9 to 10, wherein the polyol mix comprises at least one of the castor oil or the castor oil derivative.

12. The coating of any of aspects 8 to 11, wherein the coating comprises the polyol mix, and the polyol mix comprises the aliphatic glycerine initiated polyether polyol and the ethylene diamine.

13. The coating of any of aspects 8 to 12, wherein the coating comprises the polyol mix, and the polyol mix comprises the aliphatic amine initiated trifunctional polyol and at least one of the castor oil or the castor oil derivative.

14. The coating of any of aspects 8 to 13, wherein the coating comprises the polyol mix, and the polyol mix comprises the aliphatic glycerine initiated polyether polyol and the aliphatic amine initiated trifunctional polyol.

15. A coated granular material comprising:
a granular material coated with one or more layers of a reaction product of:
a diisocyanate;
a polyester polyol, a polyether polyol, or a polyol mix comprising the polyester polyol, the polyether polyol, or combinations thereof; and
optionally a wax.

16. The coated granular material according to aspect 15, wherein the polyester polyol comprises castor oil or castor oil derivative and the polyether polyol comprises an aliphatic glycerine initiated polyether polyol, an aliphatic amine initiated trifunctional polyol, or an ethylene diamine, the ethylene diamine having been propoxylated or ethoxylated.

17. The coated granular material according to any of aspects 15 to 16, wherein the coated granular material comprises the reaction product in an amount between 1% and 20% by weight of the coated granular material, inclusively.

18. The coated granular material according to any of aspects 15 to 17, wherein the granular material comprises a mineral fertilizer or a mineral salt fertilizer.

19. The coated granular material according to aspect 18, wherein the granular material comprises ammonium ions or nitrate ions.

20. The coated granular material according to any of aspects 15 to 20, wherein the coated granular material has an average diameter between 0.8 mm and 4 mm.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

The invention claimed is:
1. A method for coating a granular material, the method comprising:
pre-heating the granular material to a temperature between about 50° C. and 60° C. in a first of a plurality of zones contained within a coating apparatus;
transferring the pre-heated granular material to a second of the plurality of zones, the second of the plurality of zones including a rotating drum;
applying a first layer of a plurality of layers of a coating on the granular material, wherein the first layer includes liquid precursors, the liquid precursors comprising:
a diisocyanate;
a polyol mix comprising at least one of a castor oil or a castor oil derivative and an ethylene diamine, the ethylene diamine having been propoxylated or ethoxylated; and
a wax;
wherein applying the first layer comprises individually adding the liquid precursors to the granular material in the rotating drum in a predetermined ratio while the rotating drum continuously agitates the granular material;
reacting the first layer of liquid precursors with the granular material for a first predetermined residence time while maintaining the temperature to form a first uniform coating on the surface of the granular material;

applying a second layer of the plurality of layers to the coated granular material, the second layer comprising the diisocyanate and the polyol mix;

reacting the second layer of the plurality of layers on the first layer of the granular material for the predetermined residence time while maintaining the temperature;

applying a third layer of the plurality of layers to the granular material for a second predetermined time of less than 10 minutes;

transferring the coated granular material to a third of the plurality of zones;

continuously agitating the liquid precursors and the coated granular material in the rotating drum in the third of the plurality of zones for a third predetermined residence time to form a final uniform coating on the granular material; and cooling the coated granular material to a predetermined final temperature.

2. The method of claim 1, further comprising applying the first layer of the plurality of layers of the coating on the granular material at a temperature between about 53.3° C. and 55.6° C., inclusively.

3. The method according to claim 1, wherein the diisocyanate comprises 4,4 diphenylmethane diisocyanate (pMDI).

4. The method according to claim 1, wherein the granular material is a nitrate or urea.

5. The method according to claim 1, wherein up to about 40% of the polyol mix is the ethylene diamine.

6. The method according to claim 1, wherein the residence time for reacting the first layer of liquid precursors with the granular material and reacting the second layer on the first layer is between one minute and about ten minutes.

7. The method according to claim 1, wherein the liquid precursors and the coated granular material in the third zone are continuously agitated in the rotating drum for up to 16 minutes to form a final uniform coating on the granular material.

8. The method according to claim 1, wherein the final predetermined temperature is between about 42° C. and 52° C.

9. The method according to claim 1, wherein the rotating drum comprises a removable front dam with a hole for addition of the liquid precursors to the granular material.

10. A method for coating granular material comprising:
pre-heating a granular material to a temperature in a range between about 50° C. and about 60° C. within a first of a plurality of zones located in a rotating reaction vessel;
coating the granular material in a second of the plurality of zones located in the rotating reaction vessel with a first layer of a reaction product of:
a diisocyanate, the diisocyanate comprising 4,4 diphenylmethane diisocyanate (pMDI);
a polyol mix comprising at least one of a castor oil or a castor oil derivative and a propoxylated and/or ethoxylated ethylene diamine, wherein about 25% to 40% of the polyol mix is the ethylene diamine; and
a wax;
constantly mixing the reaction product and the granular material so that the first layer forms a uniform coating on the granular material;
reacting the reaction product with the granular material for a predetermined time of between about four minutes and about five minutes;
coating, at a constant predetermined temperature, the granular material and the first layer with a second layer of the reaction product upon expiration of the predetermined time;
reacting the reaction product with the granular material and the first layer for the predetermined time of between about 4 minutes and about 5 minutes, wherein each coating layer of the reaction product contains identical liquid precursors and the temperature within the rotating reaction vessel is maintained at the constant predetermined temperature;
curing the granular material reacted with the first layer and the second layer of the reaction product for a cure time of less than about 10 minutes to form coated granular material; and
cooling the coated granular material in a third of the plurality of zones located in the rotating reaction vessel until the coated granular material reaches a pre-determined final temperature.

11. The method of claim 10, further comprising mixing the reaction product to have a mass ratio of 3:2 of the at least one of the castor oil or the castor oil derivative to the propoxylated and/or ethoxylated ethylene diamine.

12. The method of claim 10, further comprising mixing the reaction product such that the wax consists of a 50/50 mixture of C20-24 and C30+ alpha olefin wax.

13. The method of claim 10, wherein the propoxylated and/or ethoxylated ethylene diamine comprises ethylene oxide, propylene oxide and ethylene diamine, and wherein further comprising mixing the reaction product such that the propoxylated and/or ethoxylated ethylene diamine has a molecular weight of 227 to 282 Daltons.

14. The method according to claim 10, wherein the liquid precursors are mixed before application to the granular material.

* * * * *